United States Patent
Brenstein (10) Patent No.: US 10,489,794 B2
(45) Date of Patent: Nov. 26, 2019

(54) BUSINESS TO BUSINESS MARKETING SYSTEM

(75) Inventor: Robert Brenstein, Northfield, IL (US)

(73) Assignee: ELECTRONIC CREDIT SYSTEMS CORPORATION, Northfield, IL (US)

( * ) Notice: Subject to any disclaimer, the term of this patent is extended or adjusted under 35 U.S.C. 154(b) by 1493 days.

(21) Appl. No.: 12/042,921

(22) Filed: Mar. 5, 2008

(65) Prior Publication Data

US 2008/0221992 A1 Sep. 11, 2008

Related U.S. Application Data (60) Provisional application No. 60/904,960, filed on Mar. 5, 2007.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0214* (2013.01); *G06Q 30/0236* (2013.01); *G06Q 30/0251* (2013.01)

(58) Field of Classification Search
CPC . G06Q 30/02; G06Q 30/0214; G06Q 30/0236
USPC ................. 705/14.16, 14.36, 14.49
See application file for complete search history.

(56) References Cited

U.S. PATENT DOCUMENTS

| | | | | |
|---|---|---|---|---|
| 5,537,314 A | * | 7/1996 | Kanter | 705/14.13 |
| 5,591,949 A | * | 1/1997 | Bernstein | 235/380 |
| 5,644,724 A | * | 7/1997 | Cretzler | 705/19 |
| 5,774,872 A | * | 6/1998 | Golden et al. | 705/19 |
| 5,915,023 A | * | 6/1999 | Bernstein | 705/75 |
| 6,029,141 A | | 2/2000 | Bezos et al. | |
| 6,078,898 A | * | 6/2000 | Davis et al. | 705/19 |
| 6,289,318 B1 | * | 9/2001 | Barber | 705/14.16 |
| 6,298,335 B1 | * | 10/2001 | Bernstein | 705/40 |
| 6,334,111 B1 | * | 12/2001 | Carrott | 705/14.39 |
| 6,347,304 B1 | * | 2/2002 | Taricani, Jr. | 705/19 |
| 6,363,356 B1 | * | 3/2002 | Horstmann | 705/26 |
| 7,319,975 B2 | * | 1/2008 | Monteverde | 705/14.16 |
| 7,630,986 B1 | * | 12/2009 | Herz et al. | |
| 7,774,229 B1 | * | 8/2010 | Dernehl et al. | 705/14.16 |
| 7,822,639 B2 | * | 10/2010 | Shkedi | 705/14.73 |
| 7,827,055 B1 | * | 11/2010 | Snodgrass et al. | 705/14.73 |

(Continued)

OTHER PUBLICATIONS

"Managing Partner Compliance" by Murray, Brian H., Defending the Brand, 2004, p. 75-97, 23p.*

(Continued)

*Primary Examiner* — Meredith A Long
(74) *Attorney, Agent, or Firm* — Philip S. Hof; The Small Patent Law Group (57) ABSTRACT

A method and apparatus are provided for marketing products. The method includes the steps of a first vendor contracting with a second vendor under a contract whereby the first vendor pays a commission to the second vendor in exchange for referrals of customers by the second vendor to the first vendor where the first vendor sells products that are complementary to products sold by the second vendor, the first vendor selling a product to a customer of the second vendor, a tracking program calculating a commission payable on the product and the first vendor paying the commission to the first vendor in accordance with the contract.

20 Claims, 2 Drawing Sheets

(56) References Cited

U.S. PATENT DOCUMENTS

| | | | |
|---|---|---|---|
| 7,953,630 B2* | 5/2011 | Fowler et al. | 705/14.3 |
| 8,271,326 B1* | 9/2012 | Brunet | G06Q 30/0214 |
| | | | 705/14.16 |
| 2001/0020231 A1* | 9/2001 | Perri et al. | 705/14 |
| 2001/0037205 A1* | 11/2001 | Joao | 705/1 |
| 2001/0037283 A1* | 11/2001 | Mullaney | 705/37 |
| 2002/0004735 A1* | 1/2002 | Gross | 705/10 |
| 2002/0072974 A1* | 6/2002 | Pugliese et al. | 705/14 |
| 2002/0082911 A1* | 6/2002 | Dunn et al. | 705/14 |
| 2002/0107730 A1* | 8/2002 | Bernstein | G06Q 20/20 |
| | | | 705/14.38 |
| 2002/0111856 A1* | 8/2002 | Messer et al. | 705/14 |
| 2003/0115782 A1 | 6/2003 | Baker | |
| 2003/0165223 A1* | 9/2003 | Timmins et al. | 379/207.02 |
| 2003/0187785 A1* | 10/2003 | Bernstein | 705/39 |
| 2004/0006478 A1* | 1/2004 | Alpdemir et al. | 704/275 |
| 2004/0044566 A1* | 3/2004 | Bostelmann et al. | 705/14 |
| 2004/0186768 A1* | 9/2004 | Wakim et al. | 705/14 |
| 2004/0254896 A1* | 12/2004 | Barsade et al. | 705/400 |
| 2004/0267610 A1* | 12/2004 | Gossett et al. | 705/14 |
| 2005/0086086 A1* | 4/2005 | Mack | 705/5 |
| 2005/0108044 A1* | 5/2005 | Koster | 705/2 |
| 2005/0171838 A1* | 8/2005 | Eglinton | 705/14 |
| 2006/0047537 A1* | 3/2006 | Brimdyr | 705/2 |
| 2006/0085335 A1* | 4/2006 | Crawford et al. | 705/40 |
| 2006/0165060 A1* | 7/2006 | Dua | 370/352 |
| 2006/0190350 A1* | 8/2006 | Maas | 705/26 |
| 2006/0282310 A1* | 12/2006 | Burch | G06Q 30/0214 |
| | | | 705/14.16 |
| 2007/0016472 A1* | 1/2007 | Reznik | G06Q 30/02 |
| | | | 705/14.23 |
| 2007/0016514 A1* | 1/2007 | Al-Abdulqader et al. | 705/37 |
| 2007/0043583 A1 | 2/2007 | Davulcu et al. | |
| 2007/0106560 A1* | 5/2007 | Shields | 705/26 |
| 2007/0130090 A1* | 6/2007 | Staib et al. | 705/400 |
| 2007/0198338 A1* | 8/2007 | Heywood | 705/14 |
| 2007/0226097 A1* | 9/2007 | Keechle | 705/35 |
| 2007/0271144 A1* | 11/2007 | Winquist | 705/14 |
| 2007/0288310 A1* | 12/2007 | Boos et al. | 705/14 |
| 2007/0288312 A1* | 12/2007 | Wang | 705/14 |
| 2008/0082424 A1* | 4/2008 | Walton | 705/26 |
| 2008/0221992 A1* | 9/2008 | Bernstein | 705/14 |

OTHER PUBLICATIONS

The Value Relevance of Network Advantages: The Case of E-Commerce Firms. Full Text Available by: Rajgopal, S.; Venkatachalam, M.; Kotha, S.. Journal of Accounting Research, Mar. 2003, vol. 41 Issue 1, p. 135-162, 28p, 7 Charts.*

Clayton, Michelle, Examining electronic mortgage networks, America's Community Banker, vol. 7, No. 7, Jul. 1998, p. 14-20.*

* cited by examiner

BUSINESS TO BUSINESS MARKETING SYSTEM

This application is a continuation-in-part of U.S. Provisional Patent Application No. 60/904,960, filed on Mar. 5, 2007 (now abandoned).

FIELD OF THE INVENTION

The field of the invention relates to advertising and more particularly to identification of potential customers for delivery of advertising materials.

BACKGROUND OF THE INVENTION

The field of advertising and distribution of promotional materials is generally known. Typically, advertisers target a particular type of buyer and then search for a communication medium most likely to reach the targeted buyer. For example, upscale buyers may preferentially subscribe to particular magazines or listen to one particular radio station over others. By identifying a particular medium, the advertiser may be able to tailor an ad to have a maximum impact on the targeted buyer.

While such practices are effective, they are far from perfect. Mediums such as magazines are typically distributed nationally, yet many retailers only sell locally.

Other local mediums, such as radio or television, typically tailor their content to the broadest possible audience, thereby limiting an advertiser's ability to target a particular type of buyer. Further, the availability of streaming audio (or video) over the Internet virtually eliminate any regional limitations to radio or television broadcasting.

In addition, the use of the Internet for marketing has further increased the difficulty of targeting potential buyers for the distribution of advertising materials. The right to privacy further complicates the unrestricted distribution of buyer information to vendors.

While the distribution of advertising materials under the prior art is effective, it is extremely inefficient. Because of the constant drone of commercial messages on radio and TV, many consumers simply tune out all ads. Accordingly, a need exists for a better method of distributing promotional materials to potential buyers.

SUMMARY OF THE INVENTION

A method and apparatus are provided for marketing products. The method includes the steps of a first vendor contracting with a second vendor under a contract whereby the first vendor pays a commission to the second vendor in exchange for referrals of customers by the second vendor to the first vendor where the first vendor sells products that are complementary to products sold by the second vendor, the first vendor selling a product to a customer of the second vendor, a tracking program calculating a commission payable on the product and the first vendor paying the commission to the first vendor in accordance with the contract.

DETAILED DESCRIPTION OF AN ILLUSTRATED EMBODIMENT

Figure 1:
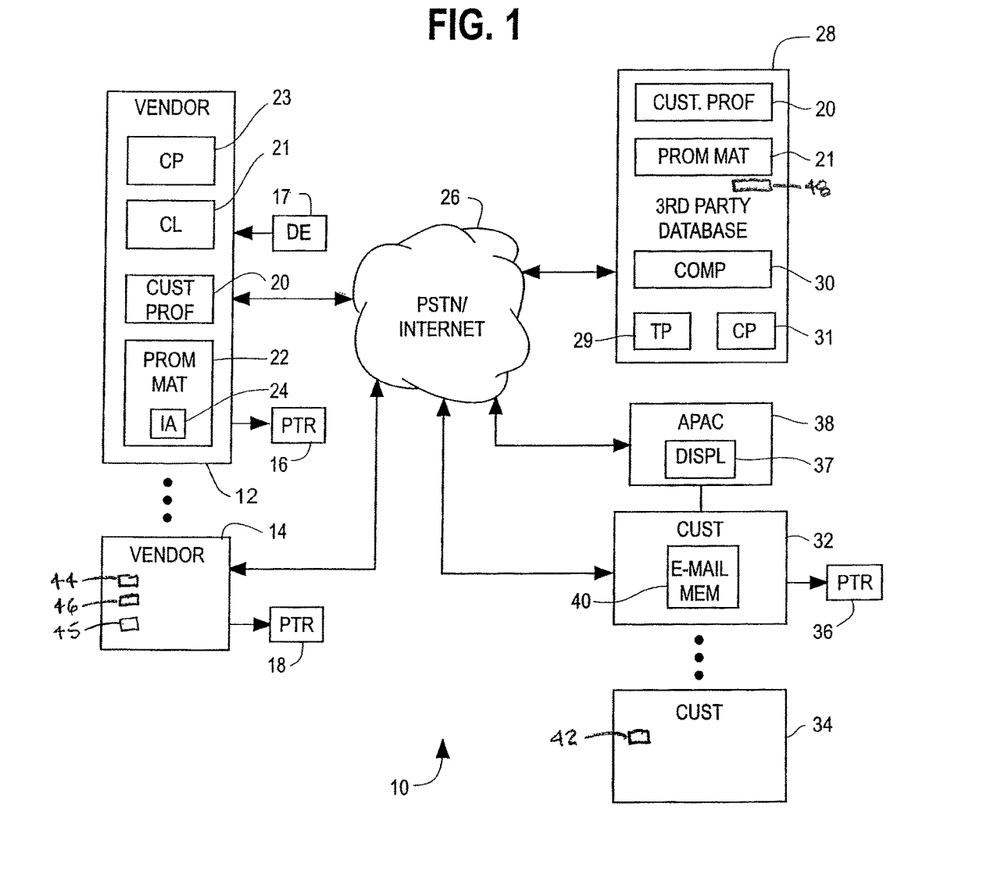
FIG. 1 is a block diagram of a system for distributing promotional materials in accordance with an illustrated embodiment of the invention.

FIG. 1 is a block diagram of a system 10 which allows vendors 12, 14 to identify potential customers 32, 34, shown generally in accordance with illustrated embodiments of the invention. While FIG. 1 shows two vendors 12, 14 and two customers 32, 34, it is to be understood that any number of vendors 12, 14 and any number of customers 32, 34 may be serviced by the system 10. Further, there is no limitation on geographic location. The only limitation under one preferred embodiment is that the vendor 12, 14 and the customer 32, 34 have access to the public switched telephone network (PSTN)/Internet and a relationship with a third-party database 28.

However, under another preferred embodiment, the third-party database 28 is independent of both vendor 12, 14 and customer 32, 24 and exists simply to track transactions. Under this embodiment, interactions between vendors 12, 14 and customers 32, 34 are detected and tracked through the use of proprietary software.

The use of the system 10 allows vendors 12, 14 and customers 32, 34 to interact at any chosen level. Interactions may occur based upon a targeted locale, interest, or under any other chosen criteria.

The third-party database 28 may be any database which tracks financial transactions of buyers 32, 34 and which under some preferred embodiments accepts customer search profiles from vendors 12, 14. The third-party database may be the third-party payment scheduler described in U.S. Pat. No. 6,298,335, issuing on Oct. 2, 2001 to the inventor of the instant application or the tax record database of U.S. patent application Ser. No. 09/679,083, filed Oct. 4, 2000 by the inventor of the instant application (both incorporated herein by reference).

Under the illustrated embodiment, a customer (i.e., a buyer) 32, 34 may periodically interact with vendors 12, 14 directly, by face-to-face contact, or through the PSTN/Internet 26. Where the contact is face-to-face, payment may be made from the customer 32, 34 to the vendor 12, 14 for goods and services using the automatic portable account controller (APAC) 38 (e.g., a smartcard or the interactive device described in U.S. Pat. No. 5,591,949). Alternatively, the contact may be by telephone or through the Internet 26. In either case, a summary of the transaction may be generated and stored in a database of the vendor 32, 34 or the database 28 of the third party 28.

Based upon the interactions between the customers 32, 34, and at least some of the vendors 12, 14, the database 28 may accumulate information regarding the buying preferences and habits of the individual customers 32, 34. Alternatively, the customers 32, 34 may request and complete a questionnaire of preferences and buying habits, which, in turn, may form a portion of the information within the database 28.

From time to time, a vendor 12, 14 (e.g., 12) may desire to expand its customer base by distributing promotional materials (e.g., coupons, special price lists, catalogs, etc.) to potential customers 32, 34. In order to identify potential customers, the vendor 12 may form a customer profile 20. The vendor may form a customer profile using a data entry device 17 (e.g., a keyboard and display). Alternatively, a CPU functioning as a customer profiler 23 may analyze past sales to form a profile of customers which are likely to patronize the vendor 12.

The customer profile 20 may incorporate any of a number of limitations specific to the type of customer 32, 34. For example, if the vendor 12 markets locally, then the profile 20 may include a limitation that identified customers 32, 34 that live in or have a history of purchasing in the locale where the vendor 12 sells. Further, the vendor 12 may include limitations that identified customers 32, 34 have previously purchased complementary products or services in the locale where the vendor 12 sells. For example, if a customer likes pizza, then a complementary product may be beer. Alternatively, if a customer 32, 34 purchases gas at a particular location, then complementary products may be convenience products offered through a convenience store in the area.

Figure 2:
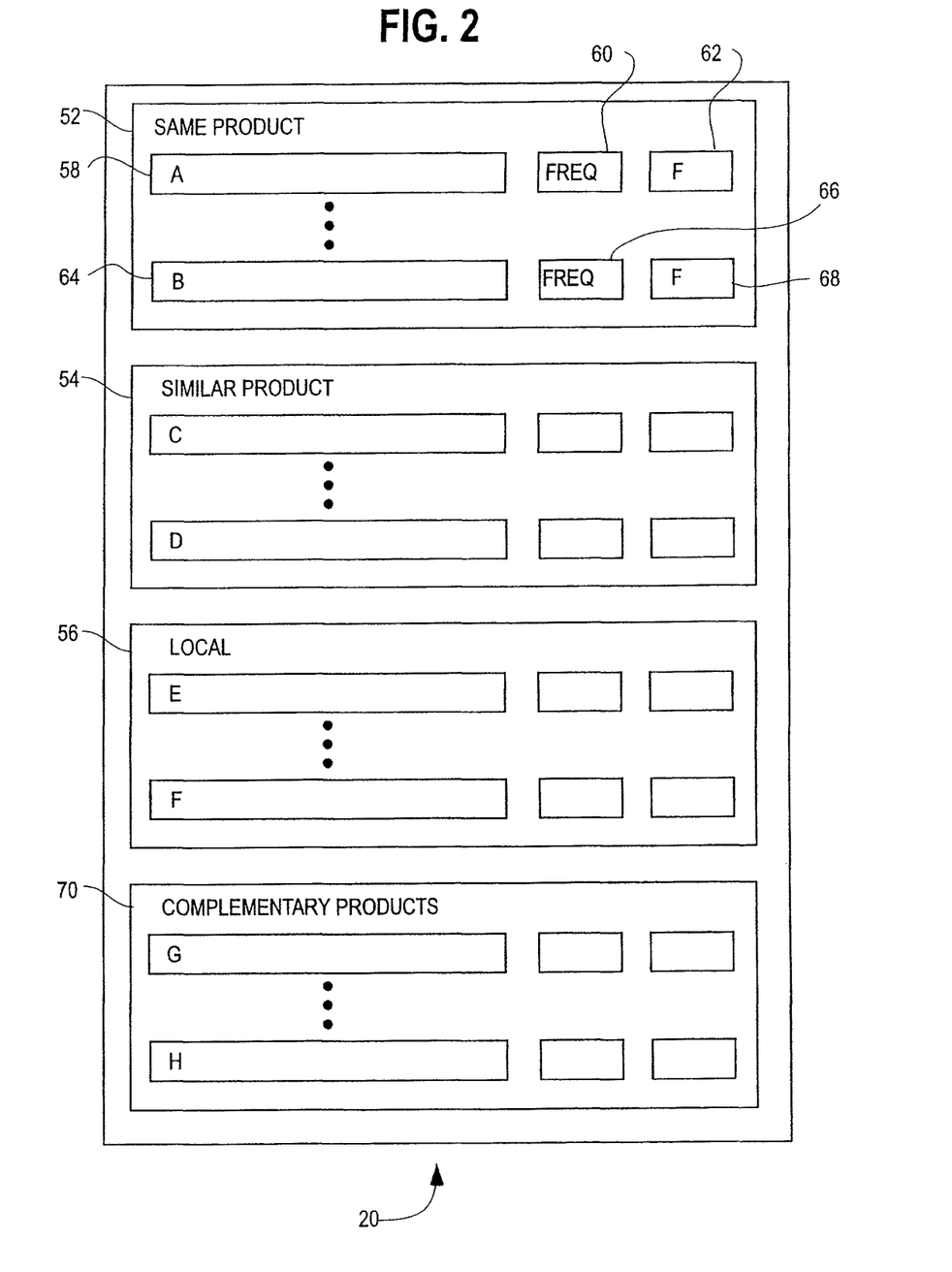
FIG. 2 depicts a customer profile that may be used by the system of FIG. 1.

FIG. 2 provides a summary of a customer profile 20. Included within the customer profile 20 may be limitations including purchases of the same products 52, similar products 54 or a locale of purchases 56. Each limitation may include a minimum frequency of purchase 60, 66 or even a dollar value 62, 68.

Upon forming the customer profile 20, the vendor 12 may transfer the profile 20 to the database 28. Within the database 28, a comparator 30 may function to compare the profile 20 to the buying habits and other information of any of a number of customers 32, 34. The database 28 may return a customer list 21 of the customers 32, 34 with the closest match to the requesting vendor 12.

In order to preserve the privacy of the customers 32, 34, the database 28 may release customer information to the vendor 12 in summary form only. For example, the database 28 may limit the release to contact information about identified customers 32, 34 which meet the limitations of the customer profile 20. The contact information (i.e., customer list 21) may be downloaded to the vendor 12.

Alternatively, customer privacy may be protected by uploading the promotional material 22 from the vendor 12 to the database 28. The database 28, in turn, may function to distribute the promotional material.

In either case, a communication processor 31 within the database 28 or vendor 12 may distribute the promotional materials 22 under any of a number of different formats. For example, where the contact information provides an e-mail address of the customers 32, 34 on the contact list 21, the database 28 or vendor 12 may send an e-mail to the customers 32, 34 on the customer list 21 containing the promotional materials 22.

To prevent fraud, the promotional materials may be customized for each customer on the customer list 21 by the addition of indicia of authenticity (e.g., a serial number) provided by the vendor 12. Where the promotional materials 22 were directly distributed to customers 32, 34 by the vendor 12 and then presented for redemption to the vendor 12, the vendor 12 may compare the indicia 24 with its own internal distribution list to determine authenticity. Alternatively, where a summary of the transaction is sent to the database 28, the database 28 may compare the indicia 24 with its own records to ensure that the indicia 24 was distributed to the customer 32, 34 presenting the materials 22 for redemption.

In the alternative, other methods may be used to distribute the promotional materials 22. For example, where the database retains the customer list 21, a transaction processor 29 within the database 28 may examine a customer identifier of each incoming purchase transaction. Where a match is found between the customer 32, 34 and an entry on the customer list 21, the database 28 may download the promotional material 22 directly to a printer 16, 18 of the vendor 12, 14.

Alternatively, the promotional materials 22 may downloaded to the APAC 38 at the point of sale. The customer may then scroll through and view the promotional materials as appropriate to the circumstance.

For example, where a first vendor 12 is offering the promotional materials 22 and a customer 32 makes a purchase from another vendor 14, a summary of the purchase may be sent to the database 28. The database 28 may compare a customer identifier from the summary of the purchase with the customer list 21. If a match is found, the database 28 may download the promotional materials 22 to the printer 18 of the vendor 14. The promotional materials 22, in fact, may be printed on the back of a sales receipt provided by the vendor 14 at the point of sale.

As a further example, consider a television (TV) vendor, a pizza store and a liquor store. A TV vendor, pizza store and liquor store are unlikely to market together. The TV vendor is a mass marketer, the pizza store would likely be small and local, and the liquor store is not likely to hook up with the pizza store, much less a TV vendor.

Consider a customer of the TV vendor, who is given promotional materials for the other stores while buying a new TV. Alternatively, consider a customer of the liquor store being given a pizza or TV offer while buying beer. All of these scenarios are possible and appropriate when the consumer is hosting a party for watching a TV program (like the Superbowl or other sporting event). In the past, none of the three merchants would cross-promote because they didn't have the means or the information to do so. Prior art systems were unable to be highly targeted and offer real time promotional opportunities because their data was not integrated. If the TV is bought at "Best Buy" on a store charge, then it would be invisible to the credit card company. Cash purchases at the pizza store would also be left out. A check for the liquor store would similarly be left out of the loop.

In order to reach customers, vendors have used a "shotgun" approach to market for the masses (like Superbowl ads that are shown to everyone) or highly targeted narrow promotions that fail to reach their targeted market. (Print advertising or radio ads are not read or heard by everyone who the vendor would like to reach.) By integrating data from all modes of payment using the database 28, it is possible to efficiently market to a highly specific consumer at a time of purchase.

The distribution of promotional materials 22 at a point of sale may have great value in the case of transient customers. For example, the customer profile 20 may correlate the one-time check-in of a customer 32, 34 into a local hotel with distribution of promotional materials. In this way, a local eatery may notify a newcomer to the area of his establishment without the necessity of mass advertising. The promotional materials 22, as above, may be printed on the back of a receipt from the hotel or e-mailed to the customer for pick-up at his convenience at a convenient e-mail terminal (possibly provided by the hotel).

Under other illustrated embodiments, a customer 32, 34 may pay a monthly fee to the database 28 to be provided with promotional materials 22 that are specific to their overall buying histories. In this case, the customer 32, 34 may provide his/her own customer profile 20 of products which that customer 32, 34 may want to receive. The customer 32, 34 may receive the promotional materials by any appropriate medium (e.g., e-mail, direct mail, point of sale print-out, etc.).

Consumers are exposed to vast amounts of unsolicited and wasteful marketing. Using the system 10 described above, it is possible for a consumer to receive, or subscribe to a service that offers, highly specific buying opportunities.

On the vendor side, there are enormous efficiencies to be gained by using the integrated data of the database 28. These efficiencies translate into avoidance of advertising costs and customer savings opportunities. Small vendors can find low cost, but highly effective, opportunities that are currently beyond their reach.

Under the system 10 described above, promotions may be based upon any of a number of prior purchases (e.g., checks, cash, tokens, store charges, accumulated points plans, credit card purchases, etc.). A customer of a toll road automatic payment system (e.g., I-Pass) who uses a bridge or toll road segment, can be given restaurant or motel promotions based on his payments, location, direction, and past motel or restaurant charges. These promotions can be for commonly used items like audio tapes of books or cellular phones that operate in cellular ranges that encompass an entire itinerary. Further, 3-g cellular phones may be provided in conjunction with GPS and the system 10 to provide enhanced promotions based upon geographic position.

In some cases, vendors 12, 14 may not be of equal size or magnitude of sales. In these cases, the synergy of sharing customer information may not always justify the use of the third party 28 or use of the third party 28 in the same way. For example, if one vendor 12, 14 were a very large merchandising organization (e.g., a mega-store) and a second vendor 12, 14 were a small specialty shop, then there would be no reason for the mega-store to use the third party 28 in the same way (if at all) because the mega-store would usually rely upon mass-advertising in any particular local area.

On the other hand, there is also no reason why both the mega-store and specialty shop could not benefit from a referral agreement. However, because of the disparity of size, the quid pro quo may not be accomplished in the same way. In these cases, the quid pro quo may be accomplished through the payment of money or other compensation for referrals. For example, if the mega-store were a grocery store and the specialty shop sold high-end grills, then referrals of customers who buy high-end grills by the specialty shop (hereinafter "the referring vendor") to the grocery store (hereinafter sometimes "the referral receiving vendor") would allow the grocery store to target advertisements involving high-profit-margin grillable foods to the referred customers. In exchange, the grocery store would make a referral payment to the specialty store for each customer referral.

It may be noted in this regard that, in general, traditional and Internet businesses can benefit from referrals. However, at present, there is no method or apparatus that connects business-to-business (B2B) arrangements with the consumer and also handles B2B payments for referrals. Moreover, current methods that attempt to accomplish referrals are cumbersome, inefficient and/or do not preserve customer privacy.

Under a first example involving the grocery store and high-end grill specialty store, the grocery store and specialty store may enter into a referral agreement where each customer referred by the specialty store may require payment of a referral fee by the grocery store. The referral fee could be a flat fee or may be based upon the volume and dollar value of grillable foods purchased by the referred customer through the grocery store. The referral agreement may include provisions that require a third party to audit the records of the grocery store for compliance with the referral agreement.

Under the first example, the specialty store may issue a discount card 42 when the customer makes a purchase of a product covered by the referral agreement (e.g., a high-end grill). The specialty store may collect contact information (e.g., name, address, etc.) through the use of a warranty registration card that is provided along with the product and that is filled out and mailed back to the specialty store by the customer 32, 34 to register under the warranty. The specialty store may save details of the transaction in a confidential file maintained by the specialty store for audit and tax purposes. If a credit card was used by the customer in the purchase of a grill, then the credit card number may be included within the file. If the purchase was a cash purchase, then the day of the transaction, the item identifier and cost of the item may be included within the file.

In addition to saving the details of the purchase for its own internal purposes, the specialty store may also generate a unique customer identifier 45 that associates the customer with the purchase of the specialty item (i.e., the high-end grill). The unique customer identifier may have an identifying characteristic (e.g., prefix) that associates the unique customer identifier with a particular referral agreement in those cases where a referring vendor 12, 14 has a number of different referral agreements with referral receiving vendors 12, 14.

The unique customer number may be imprinted on the discount card along with an identifier of the specialty store, an identifier of the referral agreement, a visual indication of the identity of the grocery store and the fact that the card is a discount card. The specialty store may also forward a list of uniquely generated customer numbers to the grocery store.

If the customer had previously given explicit permission, then the specialty store may release contact information (e.g., in summary form only) to the grocery store. Contact information may include a contact address through which the grocery store may send promotional materials regarding the subject matter of the referral agreement (e.g., grillable foods). The promotional materials may incorporate the customer identifier assigned by the specialty store to the customer.

In use, the customer 32, 34 may simply give the uniquely generated customer number to the cashier, present any promotional materials from the grocery store or the discount card from the specialty store when purchases are made at the grocery store. The cashier may enter the customer number into a point of sale terminal or the point of sale terminal may read the promotional materials or discount card 42 and discount the purchased items of the customer 32, 34 in accordance with a then current promotional discount rate. The point of sale terminal may save the unique customer number and details of the purchase into a file 44 maintained within a database of the grocery store 12, 14.

Periodically, the grocery store 32, 34 may activate a software tracking program 46 (provided by either the grocery store or specialty store) that collects sales information regarding sales made under the referral agreement. The tracking program may generate a series of entries that include an identifier of the specialty store 12, 14, the unique identifier of the customer 32, 34, a dollar value of each item and the total dollar value of the items covered under the referral agreement. The software program may then calculate a dollar value of referral payments due to the specialty store. The grocery store may then remit payment to the specialty store. Periodically, a third party agent of the specialty store may audit the files 44 of the grocery store.

Under another preferred embodiment, the third party 28 may administer referral agreements. In this case, the referring vendor 12, 14 may accept payment in any appropriate manner (e.g., cash, credit card, APAC 38, etc.). The referring vendor 12, 14 may assign a unique customer identifier to the transaction and also may give a discount card to the customer 32, 34. Alternatively, the referring vendor 12, 14 may save the customer identifier on the APAC 38. Once the transaction is complete, the referring vendor 12, 14 may forward details of a transaction (e.g., vendor identifier, referral agreement identifier, item identifier, unique customer identifier, customer contact information etc.) to the third party 38. The third party 28 may open a referral file for the transaction including the identifiers of both the referring vendor and vendor receiving the referral as well as the details of the transaction. In this example, the third party 28 may have contact information for the referred customer without knowing the identity of the referred customer.

The third party 28 may forward the unique customer identifier to the vendor 12, 14 receiving the referral. The vendor 12, 14 receiving the referral may forward promotional materials to the third party 28. The third party 28 may use the contact information to forward the promotional materials to the referred customer 32, 34. Alternatively, the third party 28 may forward the contact information to the vendor 12, 14 receiving the referrals and that vendor 12, 14 may forward the promotional material directly to the customer 32, 34.

The customer 32, 34 may make purchases from the vendor 12, 14 paying for any purchases in any appropriate manner (e.g., cash, check, APAC 38 or credit card number). If the customer 32, 34 has been given a discount card or promotional materials, then the customer 32, 34 may present the card or promotional materials at the point of sale and receive a discount. The customer 32, 34 may also simply give a cashier the unique customer identifier.

In each case, the vendor 12, 14 may compose a summary of the transaction including the unique customer identifier and send the summary to the third party 28. The summary may include a list of purchased items, the cost of each item and the total cost. The third party 28 may receive the summary from the referral receiving vendor 12, 14 and save the summary in a database of the third party 28.

Periodically, the third party 28 may activate a software program 48, that matches purchases from referral receiving vendors 12, 14 with referring vendors 12, 14. The software program 48 may identify transactions related to referrals by matching the unique customer identifier issued by the referring vendor with the unique customer identifier contained within at least some of the transaction files. In each case, the software 48 may calculate the total volume of sales of the referred customers. From the total volume of sales, the software program 48 may calculate a dollar value due to each referring vendor 12, 14 from each referral receiving vendor 12, 14. Once a referral payment is calculated the software program 48 may generate an invoice of monies due from each referral receiving vendor 12, 14 and forward the invoice to the referral receiving vendor 12, 14. Once payment is received, the third party 28 may transfer the appropriate payment to the referring vendor 12, 14.

Under another preferred embodiment, the referring vendor 12, 14 may make a full disclosure of any customer information to the third party 28. Under this embodiment, it is the obligation of the third party 28 to maintain customer confidentiality.

In this case, the referring vendor 12, 14 may accept payment for purchases in any appropriate manner (e.g., cash, credit card, APAC 38, etc.). The referring vendor 12, 14 may assign a unique customer identifier to the transaction, as above, and also may give a discount card to the customer 32, 34. Alternatively, the referring vendor 12, 14 may save the customer identifier on the APAC 38. Once the transaction is complete, the referring vendor 12, 14 may forward details of a transaction (e.g., vendor identifier, referral agreement identifier, item identifier, unique customer identifier, customer name and address, etc.) to the third party 38. The third party 38 may open a referral file for the transaction including the identifiers of both the referring vendor and vendor receiving referrals as well as the details of the transaction. The transaction details may include a unique customer identifier assigned by the referring vendor 12, 14 and a credit card number if payment was made by a credit card.

The third party 28 may forward a list of unique customer numbers to the referral receiving vendor 12, 14. The third party 28 may also receive and forward promotional materials from the referral receiving vendor 12, 14 to the referred customers 32, 34. The forwarded promotional materials may each include the respective unique customer identifier.

The customer 32, 34 may make purchases from the vendor 12, 14 paying for any purchases in any appropriate manner (e.g., cash, check, APAC 38 or credit card number). If the customer 32, 34 has been given a discount card or promotional materials, then the customer 32, 34 may present the card or promotional materials at the point of sale and receive a discount.

In this case, the vendor 12, 14 may compose a summary of the transaction and send the summary to the third party 28. The summary may include a list of purchased items, the cost of each item and the total cost. Also included within the summary may be any identifying information such as a credit card number, customer identifier assigned by the referring vendor 12, 14, etc. The third party 28 may receive the summary from the vendor 12, 14 receiving the referral and save the summary in a database of the third party 28.

Periodically, the third party 28 may activate a software program 48, that matches purchases from vendors 12, 14 that receive referrals with referring vendors 12, 14. The software program 48 may identify transactions related to referrals in any of a number of different ways. Under one embodiment, the software program 48 may match the unique customer number assigned by the referring vendor 12, 14 with purchase transactions containing the same unique customer identifier. Alternatively, the software program 48 may match purchase transactions with referrals based upon a name of the customer, a credit card number used for the transaction or any other identifying characteristic such as address. In each case, the software 48 may calculate the total volume of sales of the referred customers. From the total volume of sales, the software program 48 may calculate a dollar value due to each referring vendor 12, 14 from each vendor 12, 14 receiving vendors. Once a referral payment is calculated the software program 48 may generate and forward an invoice of monies due from each referral receiving vendor 12, 14. Once payment is received, the third party 28 may transfer the appropriate payment to the referring vendor 12, 14.

In another illustrated embodiment, large department stores (e.g., Target, Wal-Mart, etc.) have many items on their shelves, but target only the middle of any consumer demand distribution curve (i.e., they cater to the most common parts of consumer demand and ignore the extremes). For example, they sell clothes in the most popular sizes and styles. Other, smaller merchants in the area may have specialty stores that carry a narrow/specialized selection of goods, but in depth and in many sizes. In a consumer-based model, it would be beneficial for these retailers to refer to one another when appropriate. Currently, other than from a salesperson's suggestion or a coupon/brochure distribution, there is no efficient way to do this. What is proposed is an efficient way to track these referrals and/or to pay a finder or referral fee.

In another illustrated embodiment, a vendor (e.g., a hotel) commonly generates referrals to many other vendors (enterprises). For example, referrals may be sent from the hotel to taxis, restaurants, sports events, conventions and cultural events. The contracting and tracking of these activities are inconsistent, inefficient and ineffective. There is no standardized or centralized means of handling these activities.

Whereas Travelocity, Expedia and others provide a centralized means of linking related activities, they do so in a different manner. They use information from online reservations and not from information generated from a point of sale.

In this cases, the vendors 12, 14 may have a two-way referral agreement in which referrals are handled on an individual basis. That is, a referring vendor 12, 14 would receive a referral fee for each referral. At the end of the time period, the referrals would be compared and for any two vendors, the vendor 12, 14 providing more referrals would receive payment for the difference in total referral fees.

In this case, the referring vendor 12, 14 (either the large store or small store) may give a referral coupon to a customer 32, 34 when a referral is made. The referral coupon contains a name and address of the referral receiving vendor 12, 14. As above, the referral coupon may contain a unique customer identifier. The referral receiving vendor 12, 14 accepts the referral coupon and, if a sale to the customer is made, the referral receiving vendor 12, 14 makes a payment to the referring vendor 12, 14 as described in more detail above.

A specific embodiment of a method and apparatus for providing promotional materials has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A system comprising:
a computer of a referring vendor that has a referral agreement with a referral receiving vendor, the computer configured to generate a unique customer identifier that associates a customer with a product covered by the referral agreement and purchased by the customer from the referring vendor, wherein the computer generates the unique customer identifier at a point of sale while the customer purchases the product covered by the referral agreement from the referring vendor;
one or more processors located remote from the computer of the referring vendor and communicatively connected to the computer via a network, the one or more processors configured to receive the unique customer identifier from the computer and distribute promotional material of the referral receiving vendor to the customer that is associated with the unique customer identifier, wherein the promotional material of the referral receiving vendor incorporates the unique customer identifier generated by the computer of the referring vendor; and a terminal of the referral receiving vendor, the terminal configured to receive the unique customer identifier, via the network, from one or both of the computer of the referring vendor or the one or more processors,
wherein, at a point of sale while the customer purchases one or more items affiliated with the promotional material from the referral receiving vendor, the terminal is configured to receive, from the customer, one or both of the promotional material or the unique customer identifier and to discount a purchase price of the one or more items affiliated with the promotional material at the point of sale according to a predetermined discount rate in the promotional material.

2. The system of claim 1, wherein the one or more processors are configured to distribute the promotional material of the referral receiving vendor to the customer by printing the promotional material on a sales receipt provided to the customer by the referring vendor at the point of sale while the customer purchases the product covered by the referral agreement from the referring vendor.

3. The system of claim 1, wherein the one or more processors receive both the unique customer identifier and customer contact information of the customer from the computer of the referring vendor, and the one or more processors are configured to distribute the promotional material of the referral receiving vendor to the customer by sending the promotional material to the customer according to the customer contact information.

4. The system of claim 1, wherein the computer of the referring vendor issues a discount card to the customer at the point of sale with the referring vendor, the discount card including the unique customer identifier, wherein the terminal of the referral receiving vendor is configured to receive the unique customer identifier by reading the discount card presented by the customer at the point of sale with the referral receiving vendor.

5. The system of claim 1, wherein the computer of the referring vendor is configured to compile a list of plural unique customer identifiers associated with different customers of the referring vendor, the list including the unique customer identifier associated with the customer that purchased the product, wherein the terminal of the referral receiving vendor is configured to receive the list from the computer of the referring vendor or from the one or more processors via the network, and to discount the purchase price of the one or more items affiliated with the promotional material in response to matching the unique customer identifier received at the point of sale with an entry in the list.

6. The system of claim 1, wherein the one or more processors are configured to select the promotional material of the referral receiving vendor that is distributed to the customer based on a type of the product purchased by the customer from the referring vendor.

7. The system of claim 1, wherein the terminal of the referral receiving vendor is further configured to generate a transaction summary of the sale with the customer that is stored in a database, the transaction summary identifying the unique customer identifier, the one or more items affiliated with the promotional material that are purchased by the customer, the referral agreement, and the purchase price of the one or more items.

8. The system of claim 7, wherein the one or more processors are configured to access the transaction summary and other transaction summaries stored in the database and aggregate sales made by the referral receiving vendor according to the referral agreement based on the transaction summary and the other transaction summaries, wherein the one or more processors are configured to calculate a referral fee that is owed to the referring vendor by the referral receiving vendor based on the aggregate sales.

9. The system of claim 8, wherein the one or more processors are configured to generate and send an invoice that includes the referral fee to the referral receiving vendor.

10. The system of claim 1, wherein the one or more processors are components of a third party database that is located remote from both the computer of the referring vendor and the terminal of the referral receiving vendor.

11. A method comprising:
receiving, from a computer of a referring vendor that has a referral agreement with a referral receiving vendor, a unique customer identifier that associates a customer with a product covered by the referral agreement and purchased by the customer from the referring vendor, the unique customer identifier generated by the computer of the referring vendor at a point of sale while the customer purchases the product covered by the referral agreement from the referring vendor, wherein the unique customer identifier is received by one or more processors located remote from the computer of the referring vendor and communicatively connected to the computer via a network;
distributing, via the one or more processors, promotional material of the referral receiving vendor to the customer that is associated with the unique customer identifier, the promotional material of the referral receiving vendor incorporating the unique customer identifier generated by the computer of the referring vendor;
receiving, at a terminal of the referral receiving vendor, the unique customer identifier via the network from one or both of the computer of the referring vendor or the one or more processors; and
responsive to receiving, at the terminal of the referral receiving vendor, one or both of the promotional material or the unique customer identifier from the customer at a point of sale while the customer purchases one or more items affiliated with the promotional material from the referral receiving vendor, discounting a purchase price of the one or more items according to a predetermined discount rate in the promotional material.

12. The method of claim 11, wherein the distributing operation includes printing the promotional material of the referral receiving vendor on a sales receipt provided to the customer by the referring vendor at the point of sale while the customer purchases the product covered by the referral agreement from the referring vendor.

13. The method of claim 11, wherein the distributing operation includes sending the promotional material to one or more of an email address or a direct mail address of the customer based on customer contact information obtained from the computer of the referring vendor.

14. The method of claim 11, further comprising issuing a discount card to the customer at the point of sale with the referring vendor, the discount card including the unique customer identifier, wherein the unique customer identifier is received from the customer by reading the discount card presented by the customer at the point of sale with the referral receiving vendor.

15. The method of claim 11, further comprising receiving, at the terminal of the referral receiving vendor, a list of plural unique customer identifiers generated by the computer of the referring vendor, the list including the unique customer identifier associated with the customer that purchased the product, wherein the discounting operation includes matching the unique customer identifier that is received from the customer at the point of sale with the referral receiving vendor with an entry in the list for validation prior to discounting the purchase price.

16. The method of claim 11, further comprising generating a transaction summary of the sale between the referral receiving vendor and the customer and storing the transaction summary in a database, the transaction summary identifying the unique customer identifier, the one or more items affiliated with the promotional material that are purchased by the customer, the referral agreement, and the purchase price of the one or more items.

17. The method of claim 16, further comprising accessing, via the one or more processors, the transaction summary and other transaction summaries stored in the database and aggregating sales made by the referral receiving vendor according to the referral agreement based on the transaction summary and the other transaction summaries stored in the database, wherein the method comprises calculating, via the one or more processors, a referral fee that is owed to the referring vendor by the referral receiving vendor based on the aggregate sales.

18. A system comprising:
one or more processors of a third party database located remote from a computer of a referring vendor that has a referral agreement with a referral receiving vendor, the one or more processors communicatively connected to the computer via a network and configured to receive, via the network, a unique customer identifier that associates a customer with a product covered by the referral agreement and purchased by the customer from the referring vendor, wherein the unique customer identifier is generated by the computer at a point of sale while the customer purchases the product covered by the referral agreement from the referring vendor, wherein the one or more processors are configured to distribute promotional material of the referral receiving vendor to the customer that is associated with the unique customer identifier, the promotional material of the referral receiving vendor incorporating the unique customer identifier generated by the computer of the referring vendor; and
a terminal of the referral receiving vendor communicatively connected via the network to the one or more processors of the third party database and configured to receive the unique customer identifier from the one or more processors,
wherein, at a point of sale while the customer purchases one or more items affiliated with the promotional material from the referral receiving vendor, the terminal is configured to receive, from the customer, one or both of the promotional material or the unique customer identifier and to discount a purchase price of the one or more items affiliated with the promotional material at the point of sale according to a predetermined discount rate in the promotional material.

19. The system of claim 18, wherein the terminal is configured to receive the unique customer identifier from the one or more processors as an entry in a list of multiple unique customer identifiers, wherein the terminal is configured to discount the purchase price of the one or more items affiliated with the promotional material responsive to validating that the unique customer identifier received from the customer at the terminal matches the corresponding entry in the list.

20. The system of claim 18, wherein the terminal is configured to generate a transaction summary of the sale between the referral receiving vendor and the customer, the transaction summary identifying the unique customer identifier and the purchase price of the one or more items affiliated with the promotional material, and wherein the one or more processors of the third party database are configured to aggregate sales made by the referral receiving vendor according to the referral agreement based at least in part on the transaction summary, and calculate a referral fee that is owed to the referring vendor by the referral receiving vendor based on the sales.

* * * * *

UNITED STATES PATENT AND TRADEMARK OFFICE
CERTIFICATE OF CORRECTION

PATENT NO. : 10,489,794 B2
APPLICATION NO. : 12/042921
DATED : November 26, 2019
INVENTOR(S) : Robert Bernstein It is certified that error appears in the above-identified patent and that said Letters Patent is hereby corrected as shown below:

On the Title Page

Item (12) should read Bernstein

Item (72) Inventor: Inventor Robert Brenstein's last name is: Bernstein

Signed and Sealed this
Twenty-fourth Day of March, 2020

Andrei Iancu
*Director of the United States Patent and Trademark Office*